Figure 1:
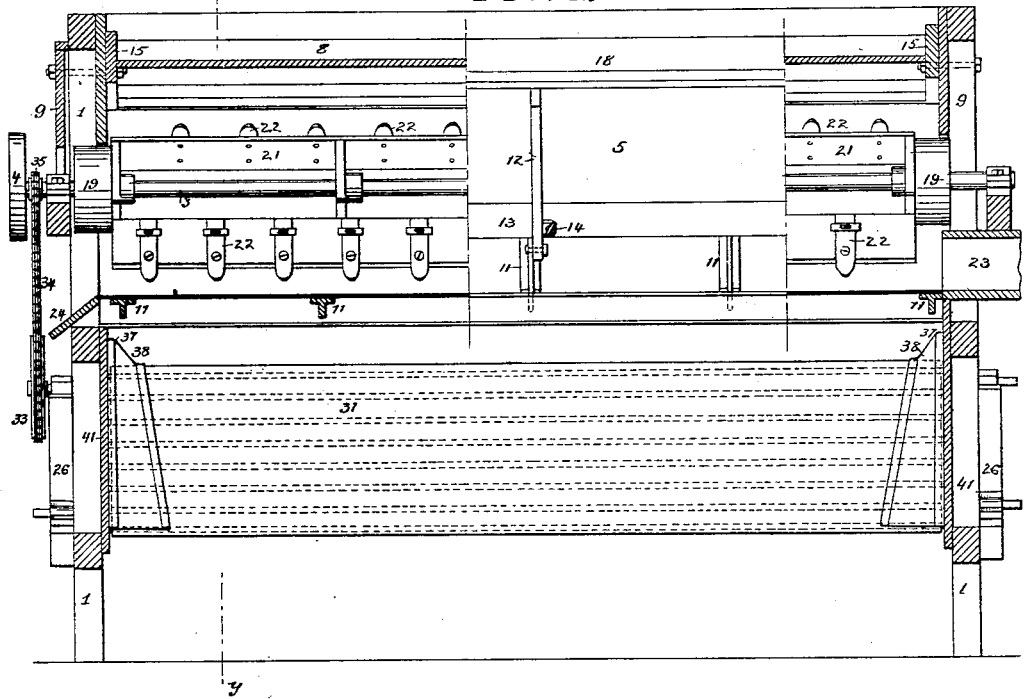

(No Model.) 3 Sheets—Sheet 1.
H. H. BRAKELEY.
MACHINE FOR SHELLING PEAS OR BEANS.
No. 593,426. Patented Nov. 9, 1897.

Witnesses:
R. Schleicher
Frank E. Bechtold

Inventor:
Harry H. Brakeley
by his Attorneys
Howson & Howson (No Model.) 3 Sheets—Sheet 2.

H. H. BRAKELEY.
MACHINE FOR SHELLING PEAS OR BEANS.

No. 593,426. Patented Nov. 9, 1897.

Witnesses:
R. Schlicht
Frank E. Bechtold

Inventor:
Harry H. Brakeley
by his Attorneys
Howson & Howson (No Model.) 3 Sheets—Sheet 3.

H. H. BRAKELEY.
MACHINE FOR SHELLING PEAS OR BEANS.

No. 593,426. Patented Nov. 9, 1897.

Witnesses:
R. Schleicher
Frank E. Bechtold

Inventor:
Harry H. Brakeley
by his Attorneys
Howson & Howson

UNITED STATES PATENT OFFICE.

HARRY H. BRAKELEY, OF BORDENTOWN, NEW JERSEY.

MACHINE FOR SHELLING PEAS OR BEANS.

SPECIFICATION forming part of Letters Patent No. 593,426, dated November 9, 1897.

Application filed March 23, 1896. Serial No. 584,473. (No model.)

*To all whom it may concern:*

Be it known that I, HARRY H. BRAKELEY, a citizen of the United States, and a resident of Bordentown, New Jersey, have invented certain Improvements in Machines for Shelling Peas or Beans, of which the following is a specification.

My invention consists of a machine for shelling peas or beans, and especially for shelling green peas while the pods are attached to the vines or to parts of the vines, the invention also comprising means for separating the shelled peas from the refuse.

In machines hitherto constructed for shelling peas, particularly when the pods are attached to the vines, the parts coming in contact with the mass of vines and pods are subjected to great wear and are expensive and not easily accessible for repairs. As the pea-shelling season is very short, lasting but a few weeks, and as the machines are usually required to do constant and severe duty on perishable material, it is evident that every hour's delay will result in great loss to the user. In previous machines also the openings provided for the escape of the shelled peas are liable to become partially choked with a matted mass of leaves, which causes a considerable proportion of the shelled peas to pass out with the vines and pods and be lost. In separating the shelled peas from the accompanying chaff the cleaning devices in common use are so constructed as to require frequent renewal in some of their most expensive parts.

The objects of my invention are, therefore, as follows: to construct a machine having but few parts and in which the parts coming in contact with the mass on which the machine acts are of the simplest, cheapest, and most durable construction and quickly and easily accessible for repairs; to provide means for the escape of the shelled peas or beans which will not readily become obstructed or in case of obstruction can be quickly and easily cleaned from the outside and without stopping the machine, and to provide more durable means than usual for separating the shelled peas or beans from the accompanying chaff. These objects I attain in the manner hereinafter set forth, reference being had to the accompanying drawings, in which—

Figure 2:
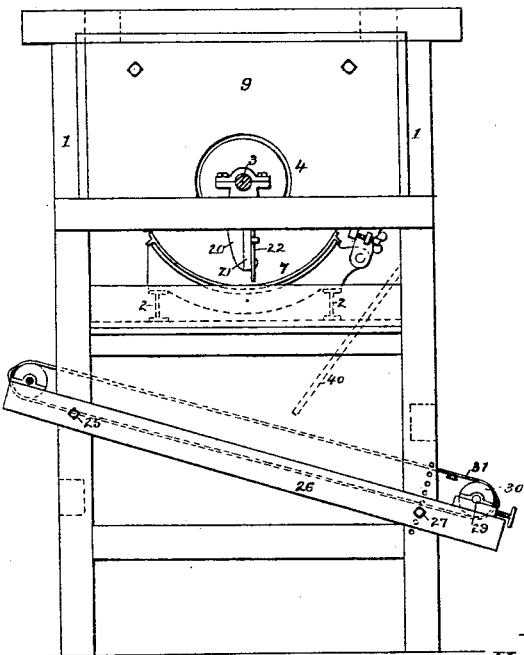
Figure 3:
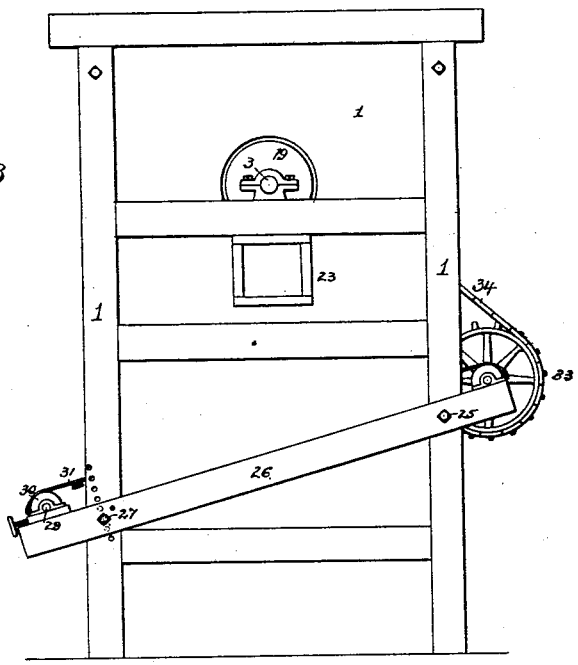
Figure 4:
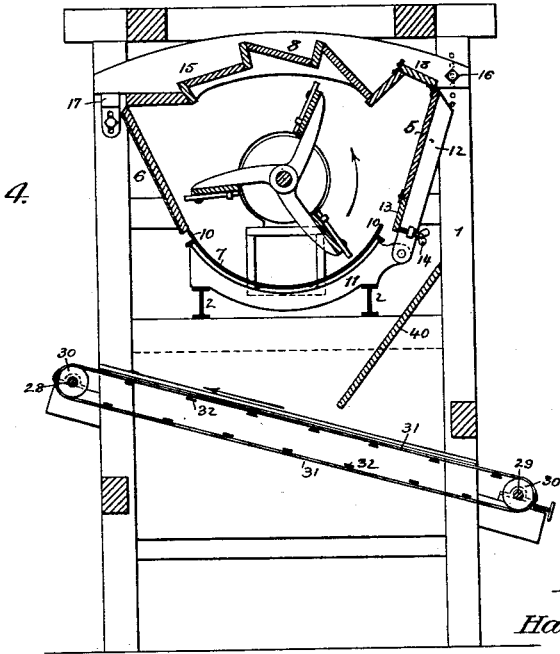
Figure 6:
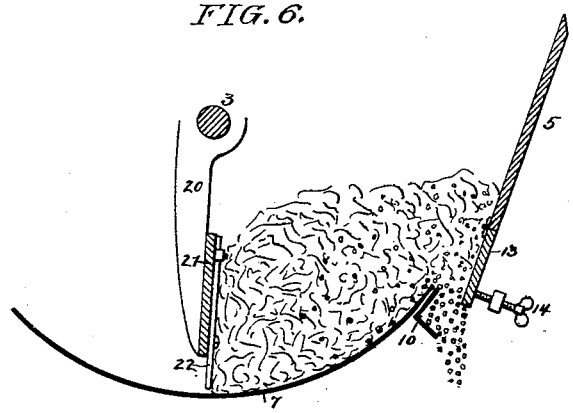
Figure 5:
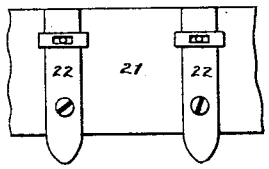

Figure 1 is a longitudinal section, partly in elevation, of a machine constructed in accordance with my invention and intended for the shelling of peas or beans. Fig. 2 is a view of the machine, looking in the direction of the arrow $w$, Fig. 1. Fig. 3 is an end view of the machine, looking in the direction of the arrow $x$, Fig. 1. Fig. 4 is a transverse section of the machine on the line $y\ y$, Fig. 1; and Figs. 5, 6, 7, 8, and 9 are detached views, on an enlarged scale, illustrating details of construction of special features of the invention.

The fixed frame of the machine comprises the opposite end frames 1, which are connected by longitudinal beams or girders 2 and by top and side rails, as indicated by dotted lines in Fig. 2, said fixed frame carrying suitable bearings for a longitudinal shaft 3, which has a pulley 4 for receiving a driving-belt from any available power-driven shaft.

The working chamber of the machine extends longitudinally from one end frame to the other and is bounded by front and back boards 5 and 6 and by a bottom plate 7, a top inclosure 8, and end boards 9. The bottom plate 7 is by preference, although not of necessity, of segmental form and is strengthened and stiffened at each end by means of an angle-bar 10, said plate being carried by curved transverse bars 11, which are supported upon the longitudinal beams or girders 2, as shown in Fig. 4. The rear board 6 occupies a fixed position, but the front board 5 is preferably mounted upon an arm 12, hung to a projection on one of the bars 11, so that it can be readily thrown down in order to permit access to the interior of the working chamber from the front of the machine. The front board 5 has at the lower end a swinging flap 13, the lower or free end of which can be moved from and toward the angle-bar 10 at the front end of the bottom plate 7 of the machine, so as to provide an opening of any desired width between the two, adjustment of said flap 13 being effected by means of a set-screw 14, carried by a lug on the arm 12. I have only shown one arm 12, but there may be as many as the desired rigidity of the structure may suggest. The bottom plate may be either an imperforate plate or it may be perforated or provided with slots, if preferred, and the front and back boards may likewise be slotted or perforated, as desired.

The top inclosure 8 of the working chamber is carried by arms 15, pivoted at the front ends by means of bolts 16 to the end frames 1 of the machine and supported at the rear upon adjustable stops 17, so that the top inclosure is free to rise when undue pressure is exerted against it. The pivot-bolts 16 at the front ends of the arms 15 may be adapted to any one of a series of openings formed in the end frames, so as to provide for raising or lowering the top inclosure to increase or decrease the capacity of the working chamber and to modify the rubbing effect upon the material subjected to the action of the machine.

The upper end of the front board 5 has a hinged flap 18, which can be connected to the front end of the top inclosure 8 by means of a hasp and staple or in any other appropriate way, this hinged top flap of the front board permitting the vertical adjustment of the top inclosure in the manner described.

The shaft 3 has at each end a short cylindrical disk 19, which fits with comparative snugness in a circular opening in the respective inclosure 9 of the working chamber, and said shaft 3 has a series of arms or spiders 20, which carry beater-blades 21, extending from end to end of the working chamber and preferably slightly twisted or inclined longitudinally, so as to have a forward feeding effect upon the material subjected to their action.

Secured to each of the blades or beaters 21, preferably to the forward side of the same, are a series of fingers 22, which project somewhat beyond the outer edges of the blades 21, so that their outer ends travel comparatively close to the bottom plate 7 and to the inner portion of the top inclosure 8.

Extending through the end inclosures at one end of the working chamber is a feed-spout 23, the opposite end of the inclosure having a segmental opening in its lower portion, from which extends an inclined delivery-spout 24.

Figure 8:
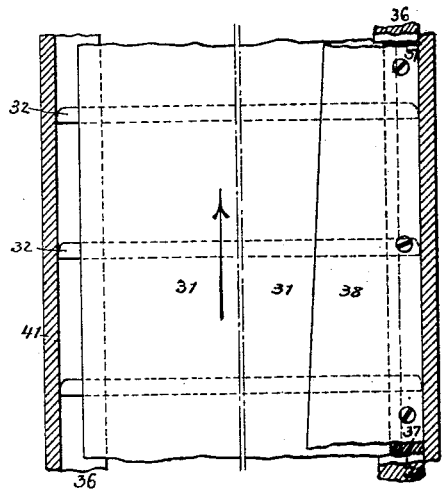
Figure 7:
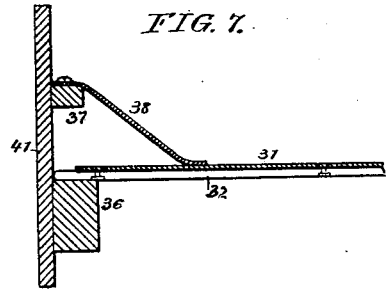
Figure 9:
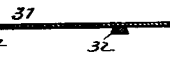

To each of the end frames of the machine is hung at 25 a bar 26, which can be adjusted to different angles by adapting a retaining-bolt 27 to any one of a series of openings formed for its reception in the end frame to which the bar is hung. These end bars 26 are provided with bearings for shafts 28 and 29, which are provided with cylindrical drums 30 for receiving a belt 31, which can be of leather, canvas, or other available material, and which is preferably provided on the inner side with slats 32 rounded on the face adjoining the belt, as shown in Fig. 9, and projecting slightly beyond the belt at the ends, as shown in Figs. 1, 7, and 8. The shaft 28 has a sprocket-wheel 33, which receives a belt 34, running to a sprocket-wheel 35 on the main driving-shaft 3 of the machine, so that the belt is caused to travel in the direction of the arrow, Fig. 4.

Suitably mounted on the fixed frame of the machine are bars 36, which follow the course of the upper run of the belt and serve to receive and support the ends of the bars or strips 32 on the inner side of said belt, and above each of the bars 36 is a bar 37, which likewise follows the course of the upper run of the belt and has a depending flexible flap or apron 38, the lower portion of which rests upon the top of the belt. The flaps 38 are by preference wedge-shaped in the direction of their length, the wide portion of each flap being adjacent to the lower belt-drum and the narrow portion adjacent to the upper belt-drum, so that the edge of the flap 38, in contact with the belt 31, is inclined slightly in respect to the line of travel of the belt, the friction between the belt and the flap tending to keep the latter extended at all times and to prevent the puckering or wrinkling of the same.

The operation of the device is as follows: The pods, either separated from the vines or having the vines or a portion of the same attached thereto, are fed into the working chamber through the feed-opening 23 and are at once subjected to the beating and elevating action of the rotating blades 21 and fingers 22, which travel in the direction of the arrow, Fig. 4. The mass of pods or pods and vines is thereupon carried in the same direction and is brought into contact with the top inclosure of the working chamber, which, as shown in Fig. 4, is so formed as to present angular pockets having abrupt rearward walls, which serve to retard the movement of the mass under the action of the blades 21 and fingers 22 and cause the rubbing and beating of the pods, so as to cause the same to open and discharge the peas or beans therefrom, the latter being protected from injury by the elasticity of the mass of vines and pods. The vines and pods are kept from falling upon the shaft 3 by the rapid movement of the blades 21. It will be observed that the front plate of the working-chamber inclosure flares outwardly, so that as the mass of vines is carried up from the segmental bottom plate 7 it is permitted to open out, so as to release the shelled peas and permit of the discharge of the same downwardly through the opening between the front edge of the segmental bottom plate 7 and the flap 13 at the lower edge of the flaring front plate 5. The projecting fingers 22, by engagement with the tangled mass of vines or leaves, insure the forward movement of the mass and prevent the clogging of the same between the blades 21 and the bottom plate 7 or top inclosure 8, at the same time tearing the vines apart and presenting new surfaces to the action of the beaters and rubbers. The pockets of the inclosure 8 provide receptacles into which any surplus portions of the mass can find their way, while in the event of a pressure upon the mass greater than the weight of the top inclosure and its arms said top inclosure will yield, so as to relieve the mass from such pressure. The weight or pressure of the top inclossure may be readily regulated to impart the desired pressure as the mass of vines moves slowly from the feed end to the discharge end of the machine. The shelled peas or beans fall to the bottom of the working chamber and are carried forward by the mass of pods, vines, or leaves, so as to be moved along without being bruised or crushed, until they are finally delivered over the forward edge of the bottom plate 7 and fall through the space between the same and the flap 13 of the front board 5 onto a directing-board 40, whereby they are thrown onto the surface of the upwardly-inclined traveling belt 31. A certain amount of chaff and dirt of necessity escapes from the working chamber with the peas or beans, and this chaff or dirt is carried upward by the belt and delivered from the same when it passes over the uppermost drum 30, the peas or beans rolling downward on the belt and being delivered from the same over the lower drum 30. As the slats 32 pass over the drums 30 a slight vibration is imparted to the belt, sufficient to keep the peas or beans in motion thereon, but not sufficient to dislodge from the belt the particles of dirt or chaff which may be delivered onto the same. By rounding the upper surfaces of the strips or slats 32 cutting or abrasion of the belt as the same passes around the drums 30 is prevented, and by the use of the aprons 38 at each side of the belt escape of the peas or beans over the edges of the same is cut off. The projecting end portions of the slats 32 are beveled or rounded, as shown in Fig. 8, to prevent them from catching upon the edges of the end inclosures 41, so as to serve, by contact with said end inclosures 41, to properly center the belt and prevent any excessive lateral movement of the same.

The use of cylindrical drums instead of reels or prismatic rollers for carrying the separating belt or apron avoids the sharp jerking and cutting action of the angles of such carriers and greatly adds to the life of the apron.

The disks 19 at the ends of the working chamber prevent any access of the vines or leaves to the shaft 3 and consequent entanglement of the same with said shaft, which might be likely to take place in the absence of these disks.

If the bottom plate 7 or front or back walls 5 and 6 are perforated or slotted, additional provision is thereby afforded for the escape of the shelled peas or beans; but in practice I prefer to use no other opening than the slot between the front edge of the bottom plate 7 and the lower edge of the flap 13, as it affords ample escape for the shelled peas or beans and with much less accompanying chaff. Such few peas or beans as are carried past the slot are protected from injury by the elastic mass of vines or pods in which they lie until they are afforded another opportunity to escape. The rate of discharge through the slot may be readily governed by the adjustment of the hinged flap 13 at the bottom of the front board 5.

Having thus described my invention, I claim and desire to secure by Letters Patent—

1. The combination in a machine for shelling peas or beans, of a working-chamber inclosure having end plates, front and rear boards, a bottom plate and a top plate, a rotating shaft having a series of blades thereon which do not approach closely to the working-chamber inclosure at any point, and provision for introducing the vines at one end of the working chamber and delivering them from the other end, the front board of the inclosure flaring outwardly toward the top and a front discharge-opening being formed through which the peas can pass after they have left the bottom plate, whereby, as the vines are lifted by the rotating blades, they can open out so as to discharge the shelled peas and permit the latter to fall through said front discharge-opening, substantially as specified.

2. The combination in a machine for shelling peas or beans, of a working-chamber inclosure having end plates, front and rear boards, a segmental bottom plate and a top plate, a rotating shaft having a series of blades thereon which do not approach closely to the working-chamber inclosure at any point, and provision for introducing the vines at one end of the working chamber and delivering them from the other end, the front board of the inclosure flaring outwardly toward the top and a front discharge-opening being formed through which the peas can pass after they have left the segmental bottom plate, whereby, as the vines are lifted by the rotating blades, they can open out so as to discharge the shelled peas and permit the latter to fall through the said front discharge-opening, substantially as specified.

3. The combination in a machine for shelling peas or beans, of a working-chamber inclosure having end plates, front and rear boards, an imperforate segmental bottom plate and a top plate, a rotating shaft having a series of blades thereon which do not approach closely to the working-chamber inclosure at any point, and provision for introducing the vines at one end of the working chamber and delivering them from the other end, the front board of the inclosure flaring outwardly toward the top and a front discharge-opening being formed through which the peas can pass after they have left the segmental bottom plate, whereby, as the vines are lifted by the rotating blades, they can open out so as to discharge the shelled peas and permit the latter to fall through the said front discharge-opening, substantially as specified.

4. The combination in a machine for shelling peas or beans, of a working-chamber inclosure having end plates, front and rear boards, a bottom plate and a top plate, a rotating shaft having a series of blades thereon which do not approach closely to the working-chamber inclosure at any point, and provision for introducing the vines at one end of the working chamber and delivering them from the other end, the front board of the inclosure flaring outwardly toward the top and a front discharge-opening being formed through which the shelled peas can pass after the vines have left the bottom plate and have been lifted and opened out by the rotating blades, the top plate having abrupt shoulders in the path of the material carried around by the rotating blades, substantially as specified.

5. The combination in a machine for shelling peas or beans, of a working-chamber inclosure having end plates, front and rear boards, a bottom plate and a top plate, a rotating shaft having a series of blades thereon which do not approach closely to the working-chamber inclosure at any point, fingers projecting outwardly from said blades, and provision for introducing the vines at one end of the working chamber and delivering them from the other end, the front board of the inclosure flaring outwardly toward the top and a front discharge-opening being formed through which the shelled peas can pass after the vines have left the bottom plate, and have been lifted and opened out by the rotating blades, substantially as specified.

6. The combination in a machine for shelling peas or beans, of a working-chamber inclosure having end plates, front and rear boards, a bottom plate and a top plate, a rotating shaft having a series of blades thereon which do not approach closely to the working-chamber inclosure at any point, and provision for introducing the vines at one end of the working chamber and delivering them from the other end, the front board of the inclosure flaring outwardly toward the top and being separated from the front edge of the bottom plate at its lower end so as to provide an opening through which the shelled peas can drop, but being provided at said lower end with a pivoted and adjustable flap whereby the width of said discharge-opening can be varied, substantially as specified.

7. The combination in a machine for shelling peas or beans, of a working-chamber inclosure having end plates, front and rear boards, a bottom plate and a top plate, and a rotating shaft having a series of blades thereon and having at each end a short drum adapted to an opening in the end plate of the working-chamber inclosure, whereby access of the vines to the shaft beyond said end plates is prevented, the front board of the inclosure flaring outwardly toward the top, and a front discharge-opening being formed through which the shelled peas can pass after the vines have left the bottom plate and have been lifted and opened out by the rotating blades, substantially as specified.

In testimony whereof I have signed my name to this specification in the presence of two subscribing witnesses.

HARRY H. BRAKELEY.

Witnesses:
  CHAS. E. BURR,
  H. L. MCGALLIARD.